United States Patent
Knickerbocker et al.

(10) Patent No.: US 7,833,897 B2
(45) Date of Patent: Nov. 16, 2010

(54) PROCESS FOR MAKING INTERCONNECT SOLDER PB-FREE BUMPS FREE FROM ORGANO-TIN/TIN DEPOSITS ON THE WAFER SURFACE

(75) Inventors: Sarah H. Knickerbocker, Hopewell Junction, NY (US); Sean A. Allen, Hopewell Junction, NY (US); John J. Garant, Poughkeepsie, NY (US); Jerry A. Gorrell, Lagrangeville, NY (US); Phillip W Palmatier, Hopewell Junction, NY (US); Christopher L Tessler, Poughquag, NY (US)

(73) Assignee: International Business Machines Corporation, Armonk, NY (US)

( * ) Notice: Subject to any disclaimer, the term of this patent is extended or adjusted under 35 U.S.C. 154(b) by 641 days.

(21) Appl. No.: 11/778,678

(22) Filed: Jul. 17, 2007

(65) Prior Publication Data

US 2009/0020590 A1    Jan. 22, 2009

(51) Int. Cl.
  H01L 21/44  (2006.01)
  H01L 21/00  (2006.01)
  B23K 31/00  (2006.01)
  B23K 31/02  (2006.01)

(52) U.S. Cl. .................. 438/613; 438/108; 438/612; 228/180.22

(58) Field of Classification Search ............. 438/108, 438/612, 613; 228/180.22
  See application file for complete search history.

(56) References Cited

U.S. PATENT DOCUMENTS

| | | | |
|---|---|---|---|
| 5,072,873 A * | 12/1991 | Liu et al. | 228/264 |
| 5,145,104 A * | 9/1992 | Apap et al. | 228/180.1 |
| 5,198,634 A * | 3/1993 | Mattson et al. | 219/121.43 |
| 5,244,143 A | 9/1993 | Ference et al. | |
| 6,008,071 A | 12/1999 | Karasawa et al. | |
| 6,247,631 B1 * | 6/2001 | Kawakatsu et al. | 228/51 |
| 6,319,810 B1 | 11/2001 | Ochiai et al. | |
| 6,357,648 B1 * | 3/2002 | Monno | 228/19 |
| 7,602,472 B2 * | 10/2009 | Buis et al. | 355/30 |
| 2004/0231597 A1 * | 11/2004 | Dong et al. | 118/723 E |
| 2006/0183270 A1 | 8/2006 | Humpston | |
| 2006/0289992 A1 | 12/2006 | Wood | |
| 2009/0025750 A1 * | 1/2009 | Van Herpen et al. | 134/1.1 |

* cited by examiner

*Primary Examiner*—David A Zarneke
(74) *Attorney, Agent, or Firm*—DeLio & Peterson, LLC; Kelly M. Nowak; Joseph Petrokaitis

(57) ABSTRACT

A method is provided for making of interconnect solder bumps on a wafer or other electronic device without depositing any significant amount of tin or other solder component from the solder onto the wafer surface which tin can cause shorts or other defects in the wafer. The method is particularly useful for well-known C4NP interconnect technology. In one aspect of the invention, a reducing gas flow rate is used to remove oxides from the solder surfaces and wafer pad surfaces and is of a sufficient determined or pre-determined flow and/or chamber or mold/wafer spacing to provide a gas velocity across the solder surfaces and wafer pad surfaces so that Sn or other contaminants do not deposit on the wafer surface during solder transfer. In another aspect, the transfer contact is performed below the melting point of the solder and subsequently heated to above the melting temperature while in transfer contact. The heated solder in contact with the wafer pads is transferred to the wafer pads.

6 Claims, 5 Drawing Sheets

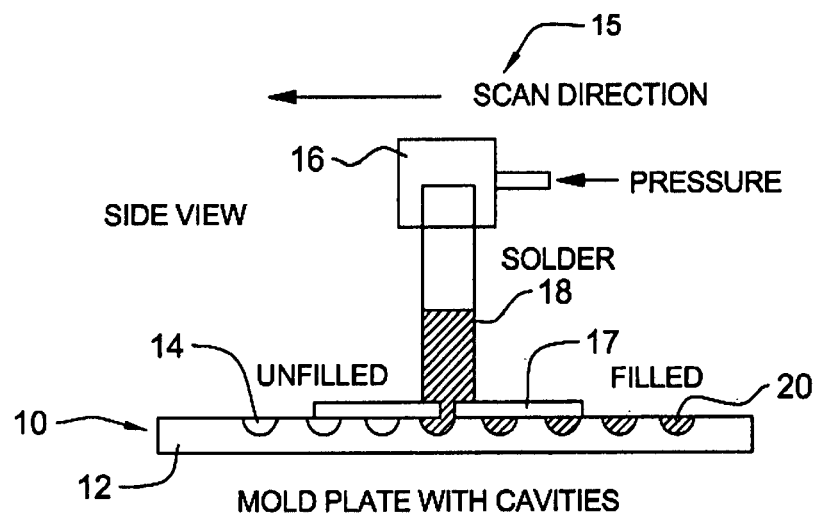
FIG. 1
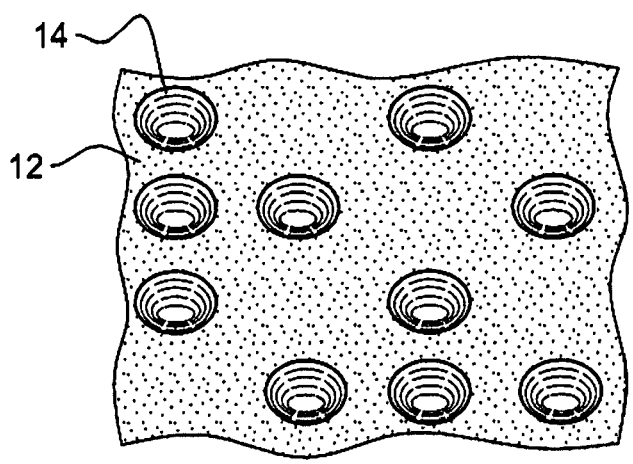
FIG. 2A
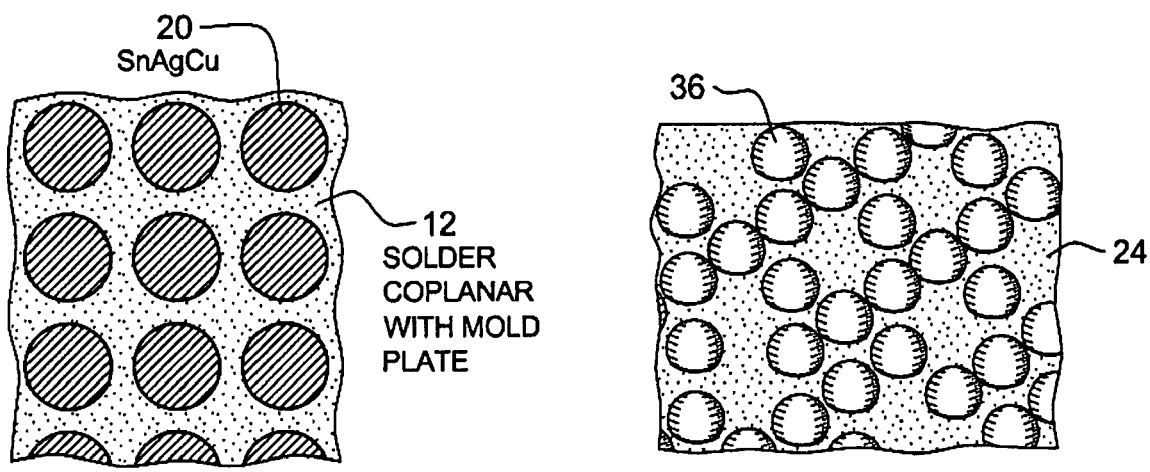
FIG. 2B
FIG. 2C

PROCESS FOR MAKING INTERCONNECT SOLDER PB-FREE BUMPS FREE FROM ORGANO-TIN/TIN DEPOSITS ON THE WAFER SURFACE

BACKGROUND OF THE INVENTION

1. Field of the Invention

The present invention relates to the making of interconnect solder bumps on a wafer or other electronic device without depositing any significant amount of tin from the solder onto the wafer surface which tin can cause shorts or other defects in the wafer, and, in particular, to the well-known C4NP interconnect technology.

2. Description of Related Art

Forming an electronic package assembly whereby an electrical component such as an integrated circuit chip is electrically and mechanically connected to a substrate, a card, or board, another chip or another electronic part is well-known in the art. This technology is generally termed surface mount technology (SMT) and has gained acceptance as the preferred means of making electronic package assemblies. The interconnect technology is commonly known as ball grid array packaging, C4 flip chip interconnect, multi-chip modules, multilayer and micro via printed wiring boards and surface mount hybrid assembly.

Multilayer ceramic and organic electronic components are typically joined to other components by soldering (or capture) pads on a surface of one of the electronic components to corresponding soldering (or capture) pads on the surface of the other component. Control Collapse Chip Connection is an interconnect technology developed by IBM as an alternative to wirebonding. This technology is generally known as C4 technology or flip chip packaging. Broadly stated, an integrated circuit chip is mounted above a ceramic or organic substrate and pads on the chip are electrically and mechanically connected to corresponding pads on the substrate by a plurality of electrical connections such as solder bumps to form an electronically connected module. A module is typically connected to other electronic components by solder or socket type connections.

In the C4 interconnect technology a relatively small solder bump is attached to the pads on one of the components being joined, typically to the chip. The electrical and mechanical interconnects are then formed by positioning the corresponding pads on the substrate to be joined adjacent the solder bumps on the chip and reflowing the bumps at an elevated temperature. The C4 joining process is self-aligning in that the wetting action of the solder will align the chip bump pattern to the corresponding pads on the substrate. Capture pads can also be sputtered and subsequently etched without any plating.

Capture pads for C4 bumps on semiconductor wafers or on the substrate to be interconnected are well-known and are typically made by a through resist plating of Ni or Cu/Ni pads onto a Cu seed layer. It is also preferred to use a conductive barrier layer on the substrate surface and the Cu seed layer is preferably made by sputtering of Cu onto a sputtered TiW layer.

In C4 technology the solder bumps are formed directly on the capture pads of the one unit. The pads are electrically isolated from other pads by the insulating chip passivation and substrate that surrounds each pad. The substrate may be un-doped silicon (Si) or some other material. The bottom of the pad is electrically connected into the chip or substrate circuit.

A major application of C4 is in joining semiconductor microchips (integrated circuits) to chip packages. Chips usually are made in rectangular arrays on a mono-crystalline slab of silicon called a "wafer," which is a thin disc several inches across. Many chips are formed on each wafer, and then the wafer is diced into individual chips and the chips are "packaged" in units large enough to be handled. The C4 bumps are placed on the chips while they are still joined in a wafer.

One method of forming solder bumps uses sputtering or vacuum deposition. Solder metal is evaporated in a vacuum chamber and the metal vapor coats everything in the chamber with a thin film of the evaporated metal. To form solder bumps on the substrate, the vapor is allowed to pass through holes in a metal mask held over the substrate. The solder vapor passing through the holes condenses onto the cool surface into solder bumps. This method requires a high vacuum chamber to hold the substrate, mask, and flash evaporator.

An alternative technique for making solder bumps is electrodeposition, also called electrochemical plating or electroplating. This method also uses a mask such as patterned photoresist and forms solder bumps only at the selected sites. Other methods include screening a solder paste through a mask and depositing micro-bumps in place.

The C4NP transfer process is the preferred method and uses a mold containing the solder and transfers the solder in the mold to the capture pad of the wafer and upon heating forms solder bumps on the wafer pads. The process however may result in organo-Sn and Sn or other components of the solder being deposited on the surface of the wafer during transfer processing. These wafers will be rejected due to these surface deposits because the presence of these deposits is a source of high resistance shorts between C4's and paths for electro-migration fails during field use. The mold solder bumps are preferably filled with solder by an Injection Molding Solder (IMS) method as described below.

Bearing in mind the deficiencies of the prior art it is an object of the present invention to improve the C4NP process and in particular the method for the transfer of the solder in the mold to the capture pad of the wafer substrate.

Still other objects and advantages of the invention will in part be obvious and will in part be apparent from the specification.

SUMMARY OF THE INVENTION

The above and other objects, which will be apparent to those skilled in the art, are achieved in the present invention which is directed to a method for forming solder bumps on an electronic substrate surface comprising the steps of:

providing a solder transfer mold having a plurality of solder mold openings in an array, which mold openings are filled with solder;

positioning the solder containing openings of the mold proximate the surface or pads of an electronic substrate to which the solder is to be transferred, preferably about 0.5 to 5 mm, or more, apart, and most preferably about 1.5 to 2.5 mm apart, the array openings in the mold corresponding to an array on the electronic substrate surface;

providing a seal around the mold and the electronic substrate and forming a chamber;

heating the chamber to an elevated temperature preferably sufficient to liquify the solder;

passing a reducing gas into the chamber contacting the mold and the electronic substrate to remove oxides from the mold solder and electronic substrate surfaces and removing the gas after passing through the chamber;

determining the flow rate of the reducing gas into the chamber needed to provide a sufficient gas velocity to prevent any significant Sn or other solder components from depositing on the substrate surface;

maintaining the determined flow rate during the transfer of the solder from the mold to the substrate;

transferring the solder from the mold openings to the corresponding array on the electronic substrate surface by bringing the solder mold and electronic substrate into transfer contact; and removing the seal from the around the mold and removing the solderless mold from the electronic substrate leaving the electronic substrate with the solder from the mold openings on the surface thereof.

In another aspect of the invention a method is provided for forming solder bumps on an electronic substrate surface comprising the steps of:

providing a solder transfer mold having a plurality of mold openings in an array, which mold openings are filled with solder;

positioning the solder containing openings of the mold proximate the surface or pads of an electronic substrate to which the solder is to be transferred so that the solder in the mold openings are approximately 0.5-5 mm, or more, preferably 2 mm from the surface of the electronic substrate, the array openings in the mold corresponding to an array on the electronic substrate surface;

providing a seal around the mold and the electronic substrate and forming a chamber;

heating the chamber to an elevated temperature at about 5 to 50° C. below the melting point of the solder;

passing a reducing gas into the chamber for an effective time, preferably for several minutes, contacting the mold and the electronic substrate to remove oxides from the mold solder and electronic substrate surfaces and removing the gases after passing through the chamber;

bringing the mold solder and electronic substrate into contact or near contact;

heating the electronic substrate and mold to above the solder melting temp;

separating the mold and electronic substrate to a distance of approximately 0.5-5 mm, preferably 2 mm;

cooling the mold and electronic substrate preferably in an inert atmosphere; and removing the seal from the around the mold and removing the mold from the electronic substrate leaving the electronic substrate with the solder in the form of the mold openings on the surface thereof.

BRIEF DESCRIPTION OF THE DRAWINGS

The features of the invention are believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

FIG. 1 is a schematic diagram showing filling of the mold plate with solder using injection molding.

FIG. 2A is a plan view of a portion of a mold plate showing the mold cavities.

FIG. 2B is a plan view of the mold plate of FIG. 2A with the mold cavities filled with solder.

FIG. 2C is a top view of an electronic substrate containing the solder transferred from the mold to the surface thereof.

DESCRIPTION OF THE PREFERRED EMBODIMENT(S)

Figure 3A:
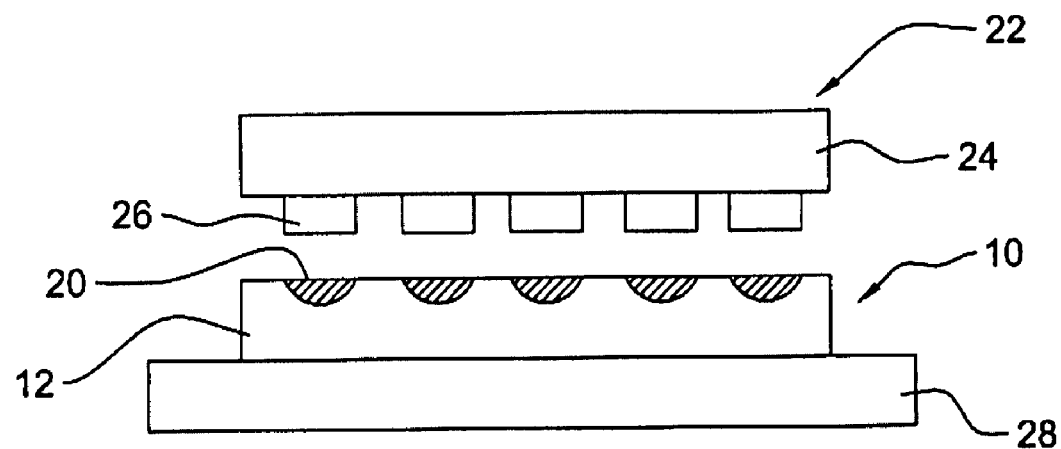
FIGS. 3A-3E are elevational, cross-sectional views of the C4NP process of one aspect of the invention.

In describing the preferred embodiment of the present invention, reference will be made herein to FIGS. 1-4E of the drawings in which like numerals refer to like features of the invention.

Various solders may be readily processed using the method of the invention and these include lead and lead-free ternary and quaternary alloys. Lead-free alloys are of particular commercial significance and for convenience the following description will be directed to such lead-free alloys although it will be appreciated by those skilled in the art that any suitable solder may be readily processed using the method of the invention. Exemplary lead-free alloys include Sn-1.8% Ag, Sn-0.5% Ag and Sn-0.7% Cu. Also, in particular, the following description will be directed to tin containing lead-free alloys since these are likewise of significant commercial interest and an efficient method of providing solder interconnects with these alloys is of important commercial consideration.

IMS is the preferred method to make mold plates containing cavities which are filled with solder and a preferred transfer device for use in the method is shown in FIG. 1. FIG. 1 shows a mold 10 comprising a mold substrate 12 having solder openings or cavities 14. An IMS apparatus shown generally as 15 comprises an injection device 16 containing molten solder 18 therein. In operation, the IMS apparatus 16 is filled with molten solder 18 and moves in relation to the cavity containing mold plate 12, both of which are usually above solder liquidus temperature. As the apparatus scans across the mold plate in the direction of the arrow, the solder 18 from the reservoir, under constant pressure, passes through a dispensing slot 17 and into the solder openings 14 filling the openings to form solder filled openings 20. After the scanning process, the mold plate 12 is cooled to solidify the solder. It is then inspected, which can be done using various automated optical techniques. After inspection, the mold plates may be either immediately sent for transfer of the solder to the wafer or other substrate or stored in a non-oxidizing environment.

The mold plates can be made from a variety of materials. Since transfer of the solder from the mold plate to the final solder receiving substrate, such as the wafer, occurs at elevated temperatures, matching the coefficient of thermal expansion (CTE) of the mold plate and substrate is important. This is especially true as the area to be transferred increases. Thus, for a single chip, or even a 4 inch diameter wafer, the smaller distance to a neutral point is such that the mold and substrate can tolerate some CTE mismatch and yet still works successfully. However, for larger areas such as 8 inch and 12 inch diameter wafers it is important that the mold material closely match the CTE of the wafer substrate, i.e., silicon.

Cavities (the solder openings) 14 in the mold plate are in a pattern and are the mirror image of the solder receiving pads on the final substrate or wafer. The cavities can be produced in a mold plate by any number of techniques, the selection of which is dependent upon the cavity size and pitch as well as the mold plate material. Cavity volume uniformity is essential since they directly determine the solder bump volume on the wafer.

The above method as shown in FIG. 1 to make a mold plate filled with solder is well-known in the art and is not a part of this invention other than to provide the solder filled mold plate which is then used to transfer the solder from the mold plate to the capture pads of the wafer or other substrate.

FIG. 2A shows a portion of a mold plate 12 having a number of cavities 14 therein.

FIG. 2B shows a portion of a mold plate 12 which openings are filled with solder forming solder filled openings 20. The surface of the solder is coplanar with the mold plate.

FIG. 2C shows the transfer of the solder from the mold plate to the wafer 24, the transferred solder 36 being in the inverted form of the solder which was in the mold cavities. A preferred solder shape is spherical.

Alignment of the mold and the transfer substrate, i.e., wafer, is critical to the success of wafer mold or bump transfer. When transparent mold plates are used, it is relatively easy to align solder filled cavities to wafer pads. When non-transparent material is used, or when a gaseous flux is used, alignment using split optics may be necessary. Depending upon the environment of the transfer, flux may or may not be used. If used, it can be applied in a thin even coat onto the filled mold plate or wafer before proceeding to the transfer fixture. Or it can be applied in the vapor phase at or near the solder transfer temperature. If not used, oxide reducing methods such as pressure variation or hydrogen reflow can help to facilitate the transfer. In general, when the solder in the mold plate is in a liquidus state and the wafer pads are oxide free, the solder wetting forces exceeds surface tension forces that maintain the molten solder in their cavities. After cooling to solidify the solder, the solder bumps are released from the mold plate onto the wafer pads and the mold plate is lifted from the wafer. The shape of the bumps on the wafer tend to be spherical, especially if the capture pad on which they are transferred is round. The wafer can now be independently subjected to a final solder reflow excursion after wafer test to obtain spherically shaped bumps on the wafer pads if test damage makes this necessary.

The present invention is directed to improving the above transfer process and it is believed that the source of tin deposits on the wafer surface are from the solder in the mold and that the deposits occur prior to contact of the solder in the mold to the capture pad on the wafer.

Figure 3B:
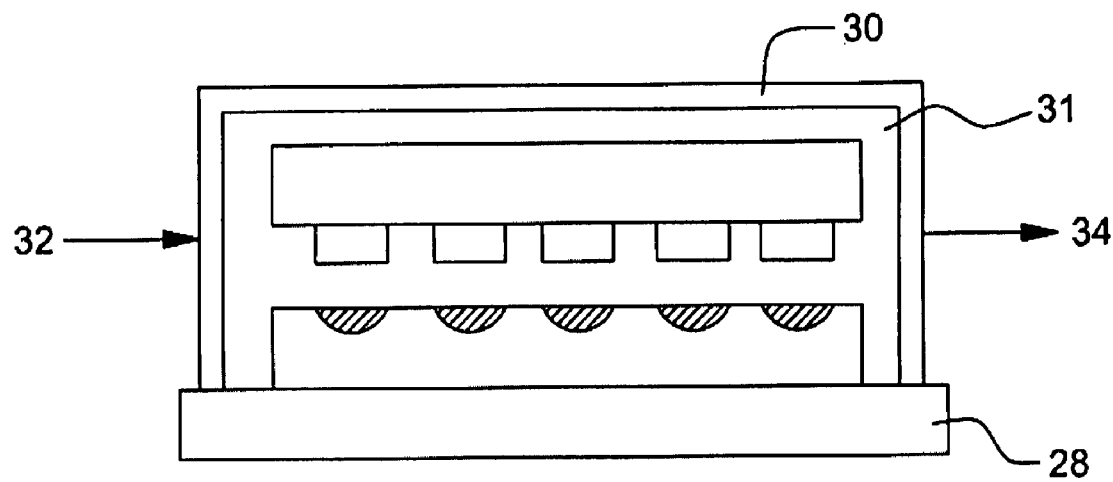
Figure 3C:
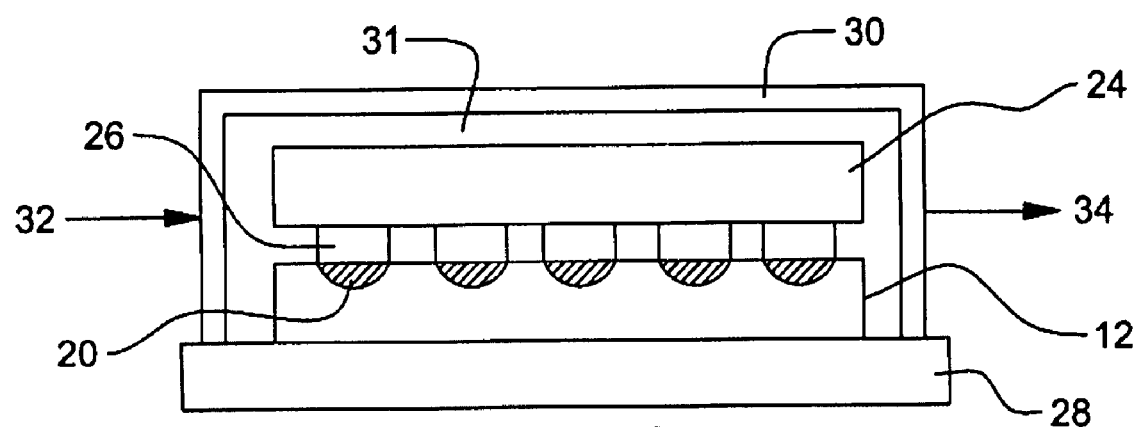
Figure 3D:
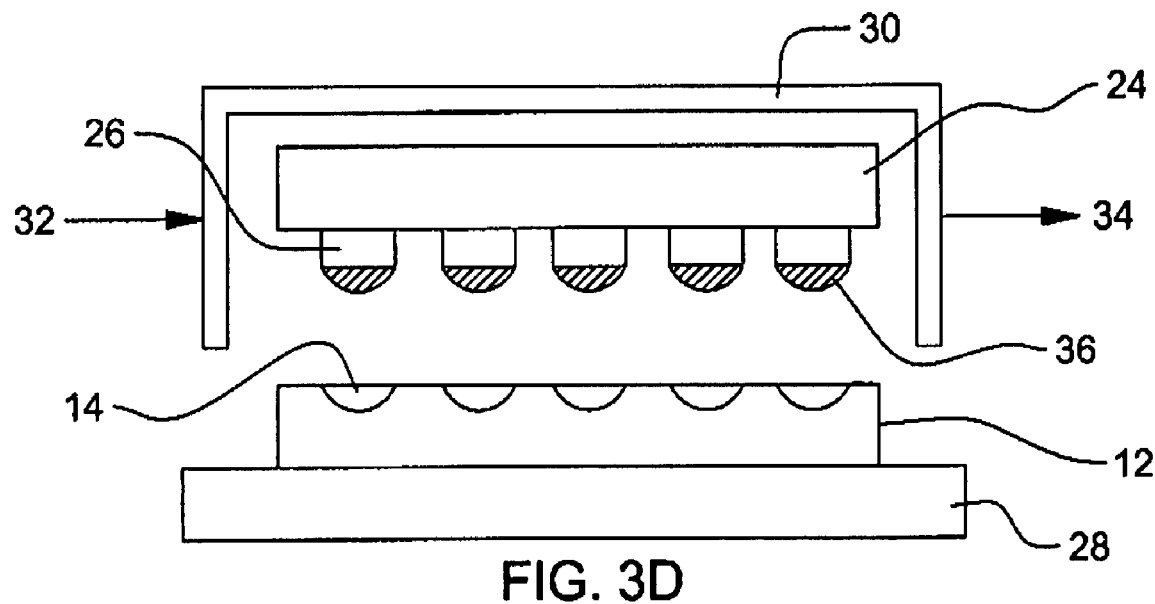
Figure 3E:
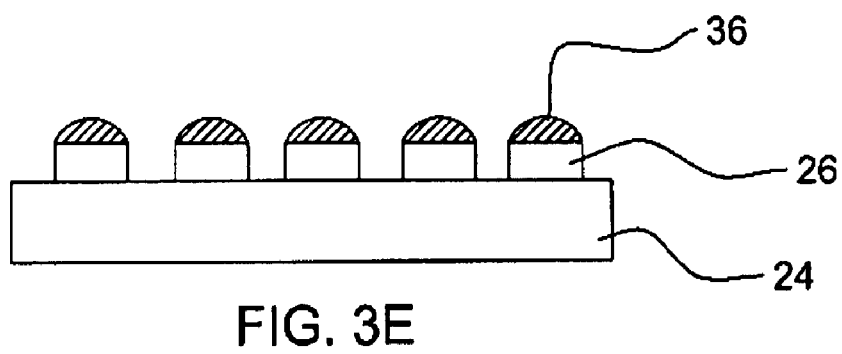

In FIG. 3A, a filled mold (containing the solder) 10 comprising a mold substrate 12 and solder filled cavities 20 and a wafer are loaded into a solder transfer tool. The mold and wafer are brought into near contact (typically about 0.5-5 mm apart). The solder transfer tool comprises a base 28 on which the mold 10 is positioned. The wafer 22 is positioned above the mold and comprises a wafer substrate 24 having capture pads 26 thereon. The capture pads are in an array corresponding to an array in the mold. As shown in FIG. 3B, a temperature resistant seal ring 30 forms a confinement chamber 31 in which gases are injected through inlet 32 and removed by outlet 34. During heat up to an elevated temperature, e.g., 280° C., flowing nitrogen in the chamber prevents oxidation of the solder or the capture pads of the wafer. A reducing gas, such as a mixture of formic acid and nitrogen, is then injected into the heated chamber creating a reducing environment. The elevated temperature is sufficient to liquefy the solder, and is preferably about 5 to 60° C. of the melting point of the solder. Any non-oxidizing gas may be used. The formic acid "cleans up" the solder, removing oxide, and also cleans the capture pad surface. After sufficient formic acid flow as determined by little oxide on the wafer or solder surface, the non-oxidizing gas flow is maintained during the transfer process. The solder and wafer are brought together in FIG. 3C so that the solder preferably contacts the capture pads and the solder wets the capture pads and the solder is transferred from the mold to the wafer pad. The mold does not have to contact the wafer surface but this is preferred from an operations standpoint. After cool down, the wafer and seal are pulled away in FIG. 3D, leaving behind a solder bump 36, in the shape of a sphere, on each capture pad 26 of the wafer 24. If the space between the mold surface and wafer pad surface is specially controlled, it may not be necessary to move the mold and wafer together since the solder wetting forces will transfer the solder from the mold to the capture pads of the wafer. The wafer with the transferred solder is shown in FIG. 3E.

The Sn contamination problem is believed to arise when one of two mechanisms occurs. In the first mechanism, some of the tin from the solder in the mold is vaporized and redeposited onto the wafer surface. The vapor pressure of Sn is fairly low, however, in the presence of formic acid, it is much greater. The second possible mechanism is that the solder in the mold has an oxide coating that is thinned during the formic acid flow. When a pin hole opens in the solder oxide surface, the liquid solder under the oxide is under pressure due to the volumetric expansion during melting and it will "squirtout" through this pin hole and spray onto the wafer surface. The liquid solder may be atomized as it rapidly exits the mold cavity through this pin hole in the oxide surface and microscopic tin balls may be formed on the wafer surface.

The subject invention is directed to methods to eliminate the surface tin contamination of the wafer during the C4NP transfer process.

In a first aspect of the invention as shown in FIGS. 3A-3E, the gas flow rate in the chamber during the transfer process is adjusted to provide a gas flow rate in the chamber which prevents Sn or other solder component from depositing on the wafer surface. When the proper flow rate is determined, this flow rate will be maintained during the transfer process. For example, using a conventional transfer apparatus for a 12 inch wafer, a doubling of the gas flow rate into the chamber, e.g., from 3.5 to 7 liters/minute, has been found to effectively eliminate these deposits by increasing the gas flow rate through the chamber. It is believed that the formic acid "clean up" of the mold solder is now much quicker and balling of the solder can occur nearly simultaneously as the solder melts, effectively eliminating the likelihood of depositing Sn microballs on the wafer surface. If Sn is forming a vapor, it is likely swept away by the higher gas flow rate making it more unlikely to redeposit on the surface. The flow rate may also be predetermined for a particular wafer and chamber and this flow rate used for subsequent solder transfers.

It is an important aspect of the invention that any Sn forming as a vapor not be deposited on the wafer surface and this is accomplished by maintaining an effective gas flow rate across the wafer and pad surfaces which sweeps away any vaporized Sn or other solder components during the transfer process. It will be appreciated by those skilled in the art that the gas velocity across the mold surface and wafer surface is dependent on a number of parameters such as the gas flow rate in and out of the chamber, the space between the mold and the wafer surface and the size of the containment chamber. For example, for the same gas flow rate in and out of the chamber and the same space between the mold and the wafer, a larger size containment chamber will provide a lower gas velocity across the surface of the mold and wafer. Similarly, for the same size containment chamber and space between the mold and the wafer, increasing the gas flow rate in and out of the chamber will increase the velocity across the wafer surface and mold surface. Likewise, for the same size containment chamber and gas flow rate in and out of the chamber, increasing the space between the mold surface and the wafer surface will decrease the velocity across the mold surface and wafer surface. The effective gas flow rate for a particular transfer process can be determined empirically.

It has been found for a 12 inch wafer using as the seal a confinement chamber which is about 13 inch diameter and 2 mm high that a reducing gas flow rate of about 3.5 liter/minute was ineffective to prevent the redeposition of Sn on the wafer surface. Doubling the flow rate to about 7 liter/minute prevented the formation of Sn deposits on the wafer surface. In this example the space between the mold surface and wafer surface was the same and was about 2 mm. If the space was increased it would be preferable to likewise increase the gas flow rate into the chamber above the 7 liter/minute flow rate. If a smaller confinement chamber is used, a lower gas flow rate in and out of the chamber can be used to provide the sufficient gas velocity to prevent Sn contamination of the wafer surface.

Broadly stated, if, in the operation of the C4NP transfer process it is found that there is Sn or other solder component contamination on the wafer surface, the Sn contamination can be prevented following the method of the invention by either increasing the reducing gas flow rate into the chamber, reducing the size of the chamber at the same flow rate and/or reducing the space between the wafer surface and mold surface. If, for example, as noted above, the confinement chamber and space between the wafer and mold surfaces are kept constant, increasing the flow rate of the reducing gas will increase the gas velocity across the wafer surface and mold surface and prevent Sn deposition the wafer surface.

In a preferred aspect of the invention, an effective flow rate into the chamber is determined or pre-determined for a specific chamber, wafer size, and spacing and this or a higher flow rate is maintained during the transfer process. Deposition of Sn on the wafer surface can be determined by examination of the wafer visually. For many cases, 1× visual is adequate. Further confirmation can be done with a low powered microscope. XPS can be used to get a quantitative Sn concentration.

In a second aspect of the invention as shown in FIGS. 4A-4D, a second transfer method of forming the solder bumps on the wafer is shown. In this method, a low temperature reduction (scrub) and low temperature contact is used, effectively eliminating the possibility of either defect mechanism occurring. In this method, the solder comes in contact with the wafer before melting, so it is not easily vaporized nor will any significant tiny pin holes be formed in the mold solder surface oxide as when there is liquid solder. An important aspect of the low temperature reduction and join is that it occurs below the melting point of the solder.

Referring now to FIGS. 4A-4D, FIG. 4A shows a mold 10 comprising a substrate 12 having opening which are filled with solder forming filled solder openings 20. The mold 10 is positioned below wafer 22 which comprises a base 24 having a number of capture pads 26 thereon. The capture pads are in the same array as the array of filled solder openings 14 of the mold 10 and the solder in the filled solder openings 20 contact the surface of the capture pads 26. The spacing between the mold and wafer is preferably about 0.5-5 mm.

Figure 4A:
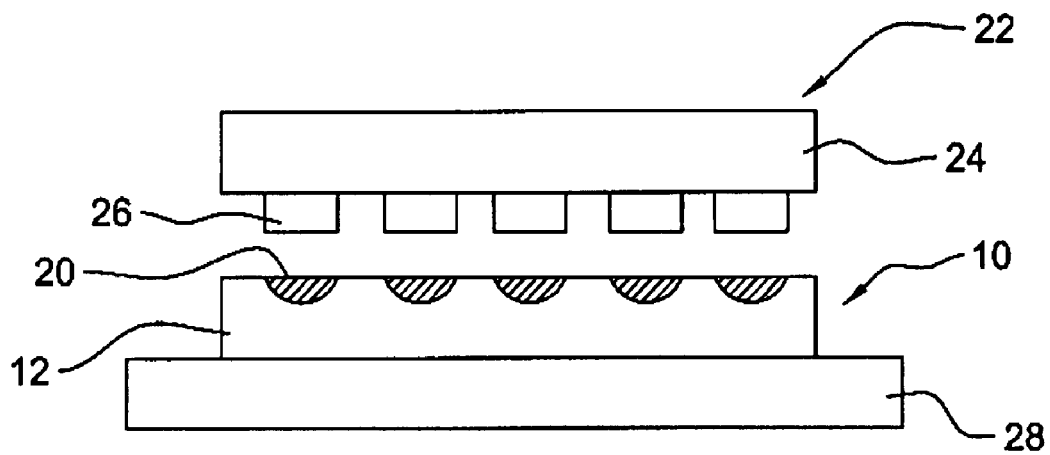
FIGS. 4A-4E are elevational, cross-sectional views of the C4NP process of another aspect of the invention.
Figure 4B:
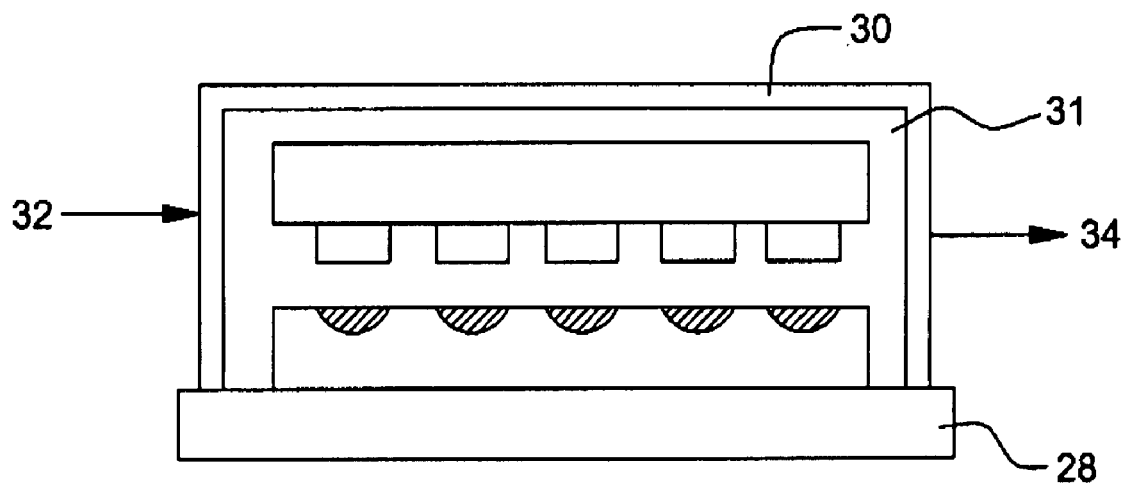

In FIG. 4B the mold and wafer are positioned in a solder transfer tool which comprises a base 28 on which the mold 10 is positioned. A temperature resistance seal ring 30 forms a confinement chamber in which gases are injected through an inlet 32 and removed by outlet 34. The chamber is heated to an elevated temperature below the melting point of the solder and typically nitrogen and/or a reducing gas is flowed into the chamber to prevent oxidation of the solder or the capture pads of the wafer and/or remove oxides. The temperature in the chamber is broadly about 5 to 50° C. below the melting point of the solder and preferably about 10 to 15° C. below the melting point of the solder.

Figure 4C:
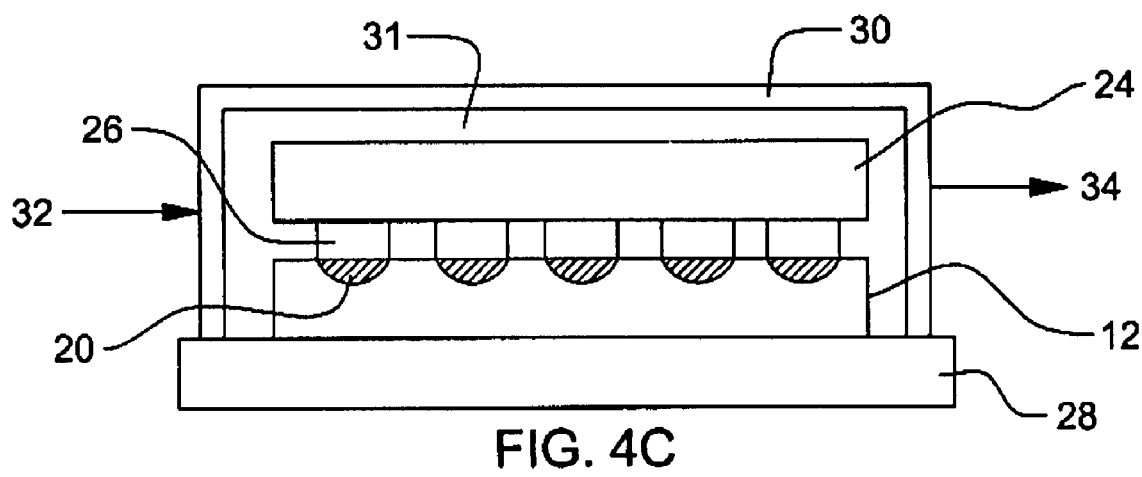
Figure 4D:
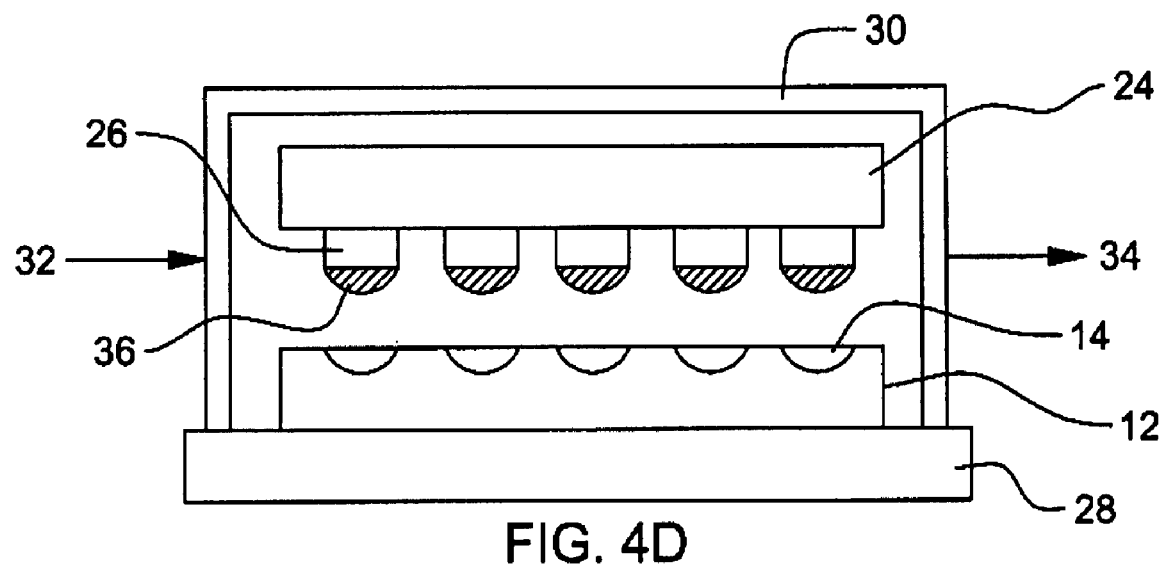
Figure 4E:
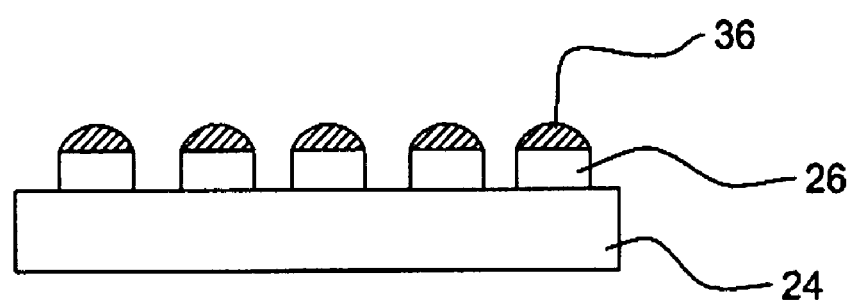

In FIG. 4C, the wafer is brought into solder transfer contact with the mold and at the conditions existing in the chamber the solder "wets" and is attached to the capture pad of the wafer by physical attraction forces and the solder is transferred from the mold to the surface of the capture pad. FIG. 4D shows the wafer and seal removed from the surface of the mold. The mold and wafer are then preferably cooled preferably in an inert atmosphere. FIG. 4E shows the solder 36 on the capture pad 26 of the wafer 24 after transfer.

The improved C4NP process of this invention is applicable to pad layers such as TiW/Ni, TiW/Co, TiW/Cu/NiP, TiW/NiV, TiW/NiV/Cu, TiW/NiSi, TiW/NiSi/Cu, and other Ni and Cu alloys that are compatible with the solder C4s. Further, while the above description describes the mold below the electronic substrate during transfer, for some methods the mold may be positioned above the electronic substrate.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:
The invention claimed is:

1. A method for forming solder bumps on an electronic substrate surface comprising the steps of:
    providing a solder transfer mold having a plurality of solder mold openings in an array, which mold openings are filled with solder;
    positioning the solder containing openings of the mold proximate the surface of an electronic substrate to which the solder is to be transferred, the array openings in the mold corresponding to an array on the electronic substrate surface;
    providing a seal around the mold and the electronic substrate and forming a chamber;
    heating the chamber to an elevated temperature preferably sufficient to liquify the solder;
    passing a reducing gas into the chamber contacting the mold and the electronic substrate to remove oxides from the mold solder and electronic component surfaces and removing the gas after passing through the chamber;
    determining the flow rate of the reducing gas into the chamber needed to provide a sufficient gas velocity to prevent any significant Sn or other solder components from depositing on the substrate surface;
    maintaining the determined flow rate during the transfer of the solder from the mold to the substrate;
    transferring the solder from the mold openings to the corresponding array on the electronic substrate surface by bringing the solder mold and electronic substrate into transfer contact or near contact; and
    removing the seal from the around the mold and removing the solderless mold from the electronic substrate leaving the electronic substrate with the solder from the mold openings on the surface thereof.

2. The method of claim 1 wherein the space between the electronic substrate and mold surface is about 0.5 to 5 mm.

3. The method of claim 2 wherein the space between the wafer pad surface and mold surface is about 1.5 to 2.5 mm.

4. The method of claim 3 wherein the reducing gas is a mixture of nitrogen and formic acid.

5. The method of claim 1 wherein the solder contains tin.

6. The method of claim 5 wherein the solder is lead free.

* * * * *